(12) United States Patent
Parmar et al.

(10) Patent No.: US 11,770,394 B2
(45) Date of Patent: Sep. 26, 2023

(54) NETWORK SECURITY SYSTEM THAT DETECTS A COMMON ATTACKER WHO ATTACKS FROM DIFFERENT SOURCE ADDRESSES

(71) Applicant: Atos IT Solutions and Services, Inc, New Castle, DE (US)

(72) Inventors: Harshvardhan Parmar, Herndon, VA (US); Vinod Vasudevan, Fairfax, VA (US); Rajat Mohanty, Fairfax, VA (US)

(73) Assignee: BULL SAS, Les Clayes Sous Bois (FR)

( * ) Notice: Subject to any disclaimer, the term of this patent is extended or adjusted under 35 U.S.C. 154(b) by 161 days.

(21) Appl. No.: 17/336,482

(22) Filed: Jun. 2, 2021

(65) Prior Publication Data

US 2022/0394048 A1     Dec. 8, 2022

(51) Int. Cl.
*H04L 29/06* (2006.01)
*H04L 9/40* (2022.01)

(52) U.S. Cl.
CPC .............................. *H04L 63/1425* (2013.01)

(58) Field of Classification Search
CPC .................................................. H04L 63/1425
See application file for complete search history.

(56) References Cited

U.S. PATENT DOCUMENTS

| | | | | |
|---|---|---|---|---|
| 11,356,472 | B1 * | 6/2022 | Maiorana | ............... H04L 63/107 |
| 2008/0037539 | A1 * | 2/2008 | Paramaguru | ............ H04L 47/32 |
| | | | | 370/465 |
| 2010/0050260 | A1 * | 2/2010 | Nakakoji | ............ H04L 63/1425 |
| | | | | 726/23 |
| 2016/0352765 | A1 | 12/2016 | Mermoud et al. | |
| 2018/0365696 | A1 * | 12/2018 | Yan | ...................... G06F 18/2321 |
| 2021/0099612 | A1 * | 4/2021 | Tashiro | .................. H04N 1/444 |

OTHER PUBLICATIONS

European Search Report issued in EP22176287.5 dated Oct. 26, 2022 (7 pages).
Hutchins, et al., "Intelligence-Driven Computer Network Defense Informed by Analysis of Adversary Campaigns and Intrusion Kill Chains", Lockheed Martin Corporation, Jan. 2011 (14 pages).
Wikipedia.org, "DBSCAN", retrieved from https://en.wikipedia.org/wiki/DBSCAN, on May 27, 2021.

* cited by examiner

*Primary Examiner* — Evans Desrosiers
(74) *Attorney, Agent, or Firm* — ARC IP LAW, PC; Joseph J. Mayo

(57) ABSTRACT

A network security system that analyzes data from network attacks to determine which attacks came from the same attacker, even if the attacker tries to disguise its identity by spreading attacks out over time and attacking from multiple IP addresses. Intrusion detection systems or firewalls may log data for each attack, such as the time of the attack, the type of attack, and the source and target addresses. Embodiments may augment this data with derived attributes that may profile the attacker's behavior. For example, some attackers may spread out attacks over time, but always attack on the same day of the week; some attackers may spread out attacks over different IP addresses, but these addresses may all be in the same country. The original and augmented data may be clustered using an algorithm such as DBSCAN, and each attacker may be identified with one of the resulting clusters.

12 Claims, 7 Drawing Sheets

NETWORK SECURITY SYSTEM THAT DETECTS A COMMON ATTACKER WHO ATTACKS FROM DIFFERENT SOURCE ADDRESSES

BACKGROUND OF THE INVENTION

Field of the Invention

One or more embodiments of the invention are related to the field of network security systems. More particularly, but not by way of limitation, one or more embodiments of the invention enable a network security system that detects a common attacker who attacks from different source addresses.

Description of the Related Art

Multiple techniques have been developed for detecting malicious activities and threats in a network. However, attacks have shifted from simple one-man attacks meant to deface or make systems unavailable to advanced targeted attacks by hacker syndicates with the objective of economic gain. State sponsored attacks have also become common with the result that advanced malware and attack techniques have emerged in the last five years. Attacks have also migrated from noisy DDOS type of attacks to stealth Advanced Persistent Threat (APT) type of attacks. APT is an example of complex multistage attacks that has different attack stages before successful compromise of the target.

Multistage attacks involve various steps and sub attacks with progression of time, and by combining result of all such attacks attackers make compound attacks. For example an attacker first tries to obtain remote code execution capability by exploiting buffer overflow vulnerability of a secure socket layer (SSL) implementation of web server. Then the attacker can embed scripts in the website to infect a user machine with malware. The malware in turn infects users browsing the website including internal users of an enterprise with the compromised machine. The malware that infects the user desktop can steal data and send it out to the attacker system. It is difficult to capture such kind of attacks using just with one security device like Intruder detection system (IDS) or Web application firewall (WAF) or end point protection devices.

Similar to the advances in type of attacks, security technologies have also evolved from detection of simple attacks. Recently the focus shifted from detecting simple attacks to detection of complex multistage attacks. For example, the research paper "Intelligence-Driven Computer Network Defense Informed by Analysis of Adversary Campaigns and Intrusion Kill Chains" (Eric M. Hutchins, Michael J. Cloppert, Rohan M. Amin) describes the multiple stages in an APT, and outlines a methodology to detect these multistage attacks. However, this methodology may fail to identify attacker's original identity if an attacker uses different IP address for multiple attacks that are part of an advanced attack scenario. So, in case of advanced attacks, identifying and correlating multiple IP addresses to the same attacker is important and makes detection easier.

For at least the limitations described above there is a need for a network security system that detects a common attacker who attacks from different source addresses.

BRIEF SUMMARY OF THE INVENTION

One or more embodiments described in the specification are related to a network security system that detects a common attacker who attacks from different source addresses. Embodiments of the invention may analyze attack data to discover patterns of attacker behavior that indicate which attacks come from the same attacker.

One or more embodiments of the invention may include a database of attacks, and a processor that analyzes the data in this database to determine which attacks come from common attackers. The data for each attack in the database may include attributes such as the address and port of the destination system attacked, the address and port of the source from which the attack originated, the time of the attack, and the type of attack. The processor may add one or more derived attributes to the attack data to form augmented attack data; derived attributes may include source location attributes derived from the source address, and time group attributes derived from the time of the attack. The processor may execute a clustering algorithm to group the augmented attacks into multiple clusters, and it may identify each cluster with a corresponding attacker.

In one or more embodiments, the source location attributes may include the source country name, the source latitude, and the source longitude.

In one or more embodiments the time group attributes may include the hour of day, the day of week, the week of year, an is-holiday flag, and an is-working-hours flag.

In one or more embodiments, the clustering algorithm may be a density-based clustering algorithm; it may be DBSCAN for example.

In one or more embodiments, the processor may also normalize the destination IP address to a numeric value, and normalize the destination port to a port categorical value. The port categorical value may be for example "small" when the destination port is between 0 and 1000, "medium" when the destination port is between 1001 and 10000, "large 1" when the destination port is between 10001 and 30000, "large 2" when the destination port is between 30001 and 50000, and "large 3" when the destination port is larger than 50000.

In one or more embodiments, the processor may encode selected attributes of the augmented attacks to form encoded attack data, and may execute the clustering algorithm on this encoded attack data. The selected attributes may be for example the destination address, the destination port, the attack type, the source country name, the source latitude, the source longitude, the hour of day, the day of week, the week of year, the is-holiday and the is-working-hours. Encoding of selected attributes may for example use one-hot encoding for categorical attributes.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

A network security system that detects a common attacker who attacks from different source addresses will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
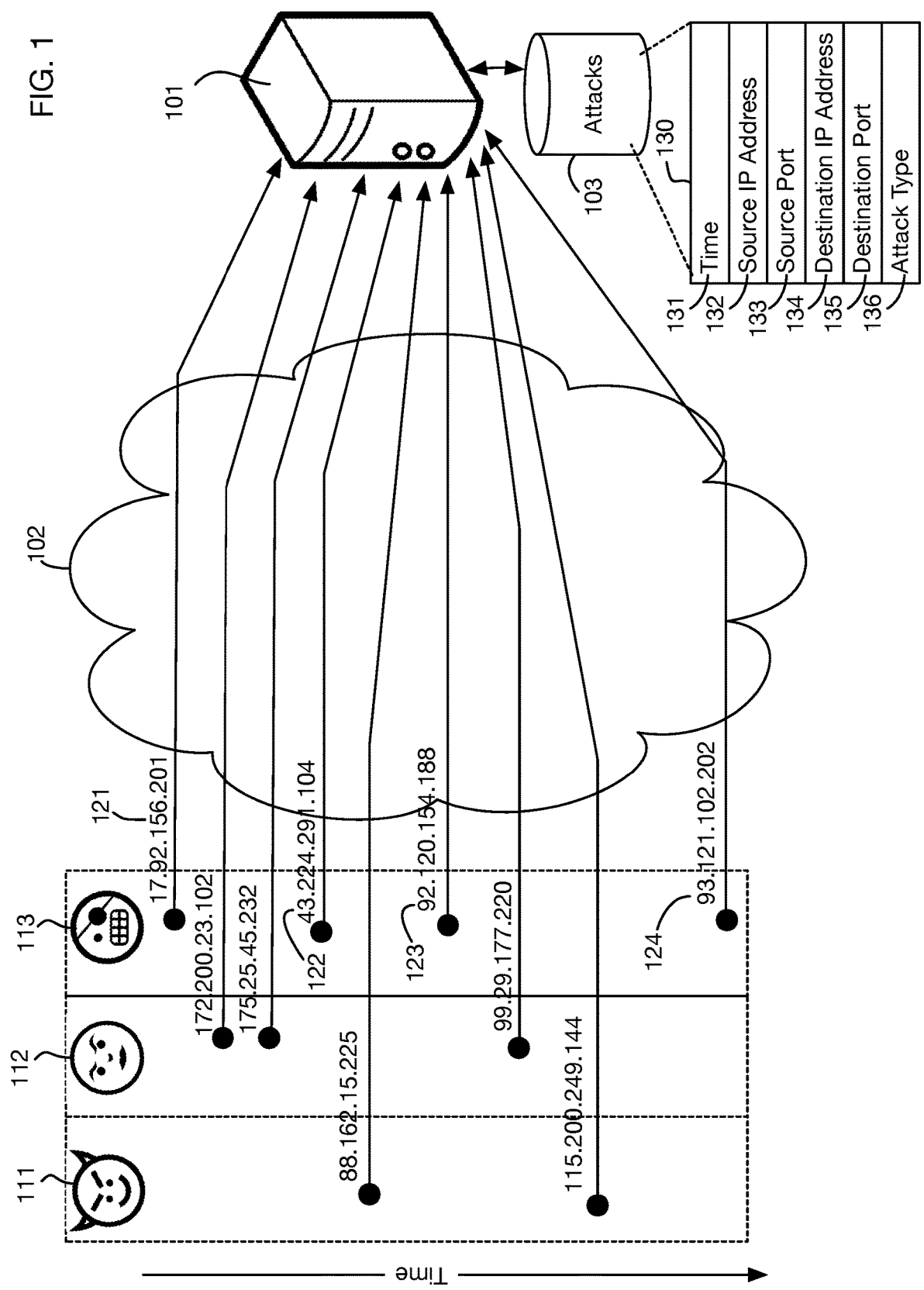
FIG. 1 illustrates a problem addressed by one or more embodiments of the invention: network attackers may be difficult to identify because they spread out attacks over time and attack from multiple IP addresses.

FIG. 1 illustrates a problem that is addressed by embodiments of the invention. A computer system (or collection of systems or other resources) 101 is subject to attacks via a network or networks 102. The system logs information about the attacks or attempted attacks in a database 103. Database 103 may be organized as any type or types of data structures, and may be stored on any type or types of storage or memory. For example, without limitation, database 103 may be a file, a collection of files, in-memory data structures, or a SQL or non-SQL database stored on disk, in memory, or in the cloud. This database 103 may for example include alerts from Intrusion Detection Systems (IDS) or firewalls, or authentication events from a service like Azure® Active Directory. Database 103 may record attributes 130 for each attack; illustrative attributes may include a timestamp 131 when the attack occurred, the IP address 132 and port 133 of the source from which the attack originated (or appeared to originate), the destination IP address 134 and port 135 of the attacked system, and the type of attack 136, such as Denial of Service or ARP Spoofing. Other attributes or different attributes may be recorded in one or more embodiments. The system may receive many attacks over a period of time. Potentially unknown to the system, in this example these attacks come from three different illustrative attackers (or syndicates of attackers) 111, 112, and 113. Each of these attackers attempts to disguise its source by attacking from several different source IP addresses. In addition, each attacker distributes its attacks over time. For example, attacker 113 launches a first attack from source IP address 121; at subsequent later times, which may be separated by minutes, hours, days, weeks, or years, it launches attacks from different IP addresses 122, 123, and 124. Attackers 111 and 112 similarly launch attacks at different times from different IP addresses.

Figure 2:
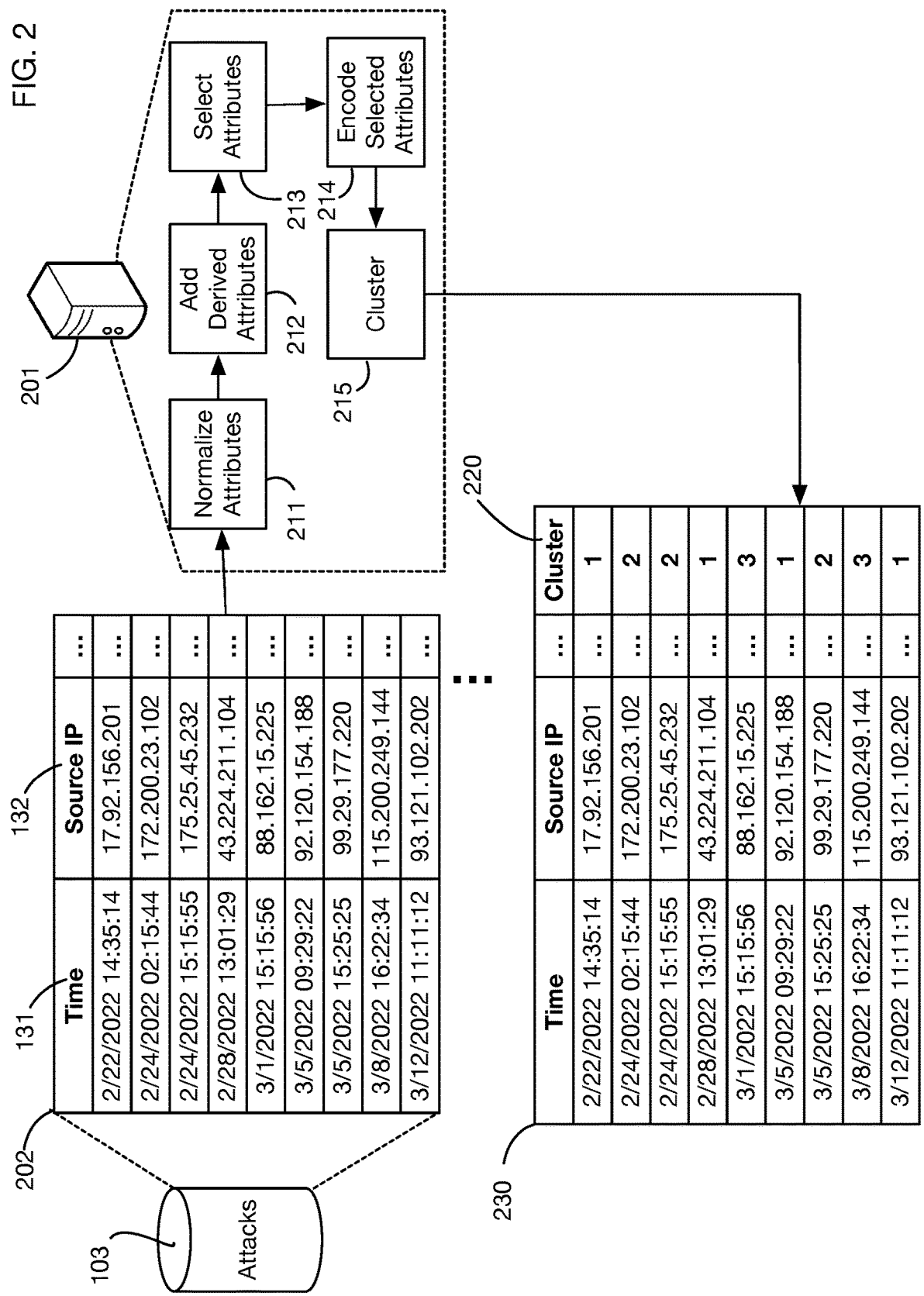
FIG. 2 shows an architectural overview of one or more embodiments of the invention.

The challenge faced by the security systems monitoring attacks on system(s) 101 is to attempt to identify which attacks come from which attackers, even when these attacks come from multiple IP addresses at multiple times. The inventors have discovered that a combination of augmenting the attack data in database 103 with additional attributes and clustering attack records based on a carefully selected set of original and extended attributes can effectively group attacks that originate from the same attacker. This approach is illustrated in FIG. 2. Attacks database 103 may contain for example table or similar data structure 202, with illustrative attributes 130 for each attack such as the time 131 the attack occurred, the source IP 132 from which the attack was launched, and potentially many additional attributes. An attack analysis processor or processors 201, which may or may not be the same as the system or systems 101 that were attacked, analyzes this data 202 to determine which attacks are from the same attackers. This analysis process, described in detail below, may include any or all of normalization 211 of attributes 130, addition 212 of derived attributes to table 202, selection 213 of attributes to be used for attacker grouping, encoding 214 of the selected attributes, and then clustering 215 the data to group attacks that appear to come from the same attacker. The resulting extended table 230 includes a cluster number (or similar identifier) 220 that maps each attack to the group of attacks that appear to be from a common attacker.

Figure 3:
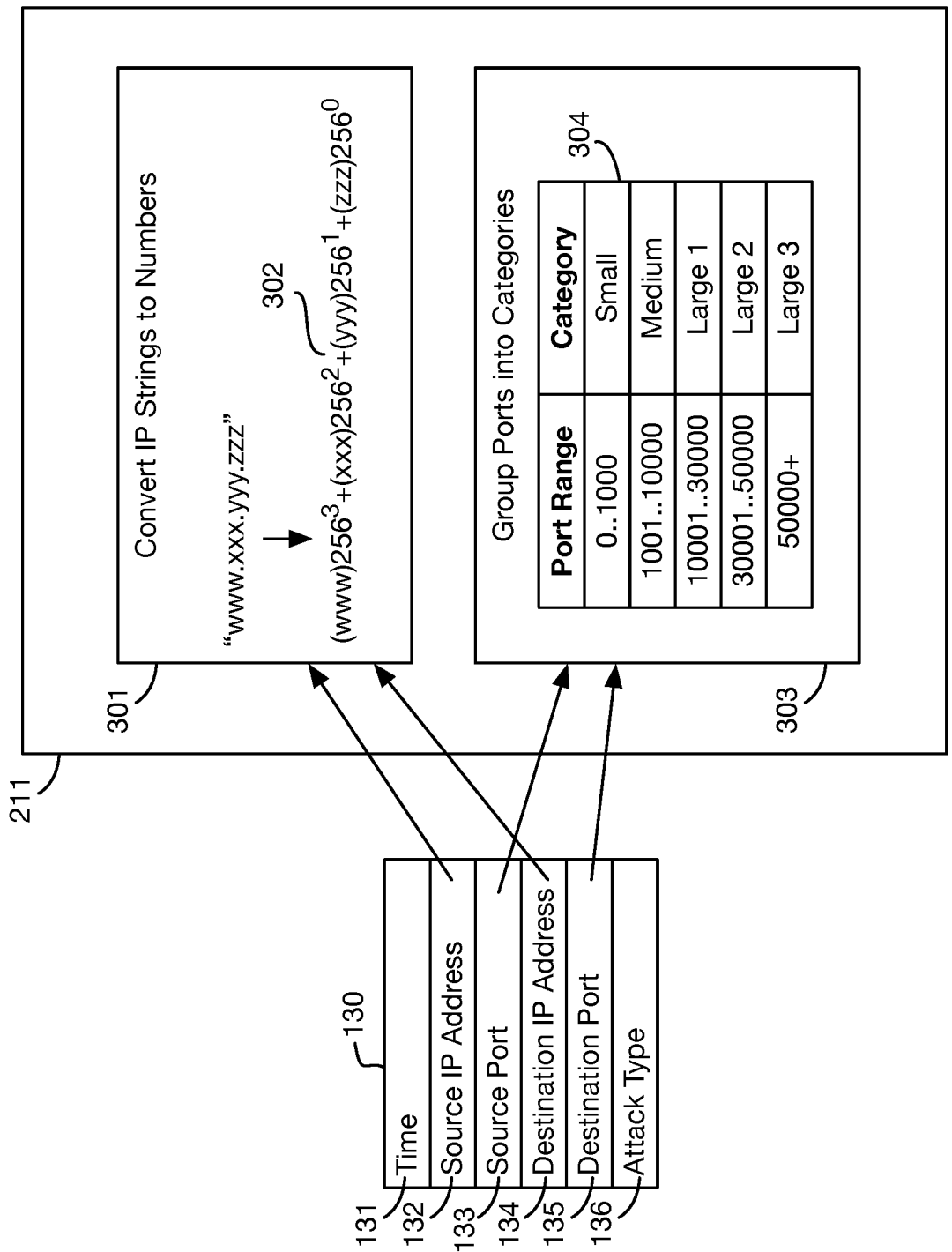
FIG. 3 illustrates normalization of attributes logged for each attack.

We now describe details of steps 211 through 215 that may be used in one or more embodiments. FIG. 3 illustrates step 211, normalization of the recorded attributes 130. Normalization 211 may transform some or all of the attributes to a different form that is more useful for the attacker analysis. For example, source IP address 132 and destination IP address 134 may be recorded in attack records as strings (such as "202.93.145.133"). Conversion 301 may transform these strings to numbers, using formula 302; this formula recovers a numeric representation of an IP address from the string format. Source port 133 and destination port 135 may be grouped in step 303 into categories that represent ranges of port numbers; illustrative categories that may be used are shown in table 304. These normalization steps are illustrative; one or more embodiments may normalize data using any types of transformations, groupings, or format changes.

Figure 4:
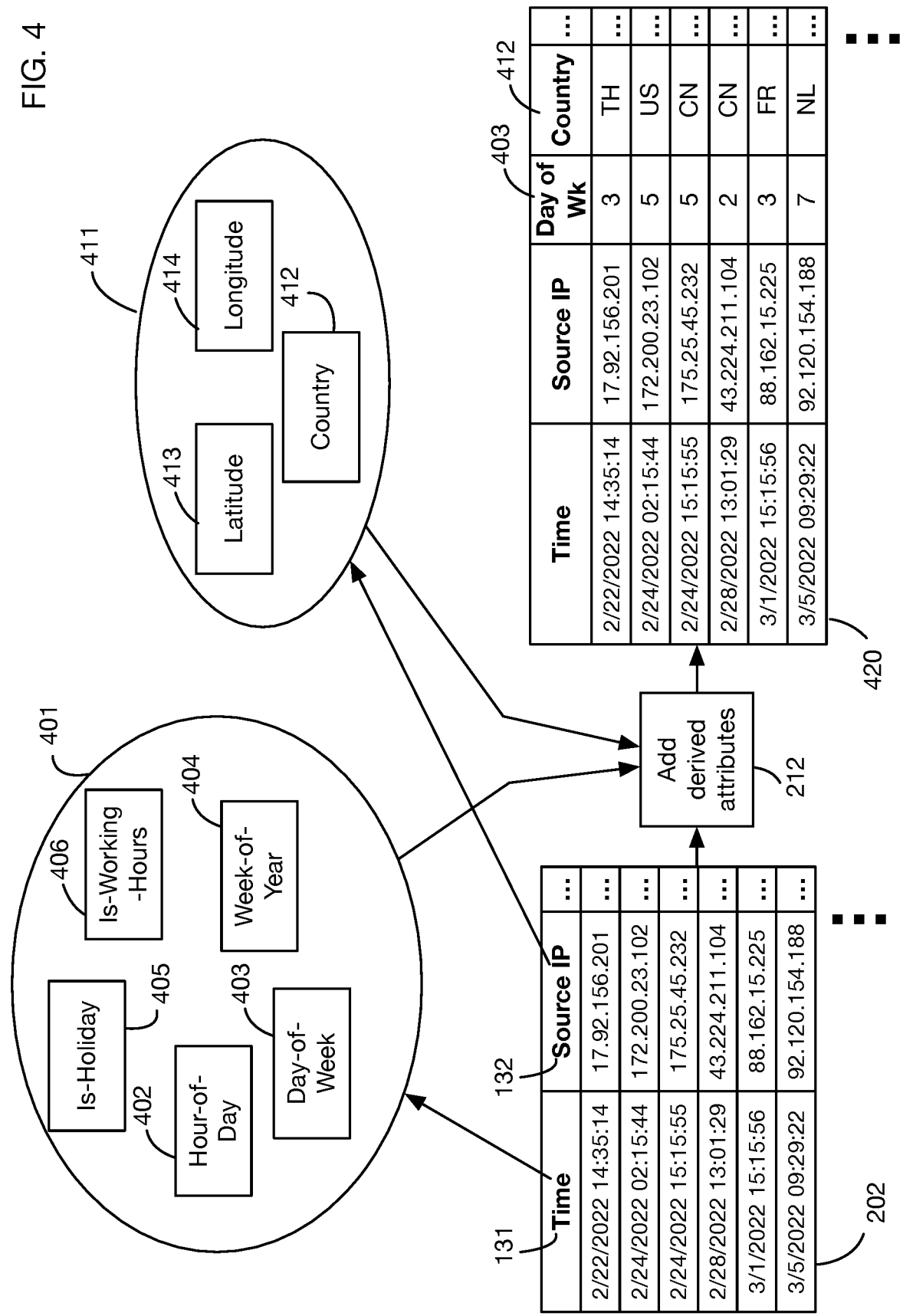
FIG. 4 illustrates addition of derived attributes to the attack data to capture behavioral patterns.

FIG. 4 illustrates the step 212 of adding derived attributes to the attack data 202, to form augmented attacks 420 that may be used for clustering (as described below). A general approach that may be used in one or more embodiments is to use demographic and behavioral information along with the recorded attack data to group attackers. Profiling users based on behavioral and demographic characteristics has been studied by various researchers. Illustrative references describing user profiling include for example P. Burge, J. Shawe-Taylor, C. Cooke, Y. Moreau, B. Preneel, C. Stoermann, Fraud Detection and Management in Mobile Telecommunications Networks, Proceedings of the 2nd European Conference on Security and Detection, 1997, pp. 91-96; T. Fawcett, F. Provost, Combining Data Mining and Machine Learning for Effective User Profiling, Proceedings of the Second International Conference on Knowledge Discovery and Data Mining (KDD), 1996, pp. 8-13; C. S. Hilas, J. N. Sahalos, Testing the Fraud Detection Ability of Different User Profiles by Means of FF-NN Classifiers, Proceedings of the 16th International Conference on Artificial Neural Networks, Part II, Lecture Notes in Computer Science, 4132, 2006, pp. 872-883; and J. Hollmen, User profiling and Classification for Fraud Detection in Mobile Communications Networks, PhD dissertation, Helsinki University of Technology, Department of Computer Science and Engineering, 2000.

User profiles are used for various application areas like e-commerce, banking, advertising, fraud detection, personalization etc. Even though researchers have not used behavioral profiling techniques for the particular problem we are trying to solve, it is promising and proven in various other application areas. The recurring nature of attacker's behavior can potentially be used to assist in attacker identification, as described for example Yinghui (Catherine) Yang, Web user behavioral profiling for user identification, Decision Support Systems 49 (2010) 261-271. A behavioral profile can represent the repeating elements in users' activity.

By experimenting with different attributes that can be associated with an attack, the inventors have discovered that the behavior of an attacker can be effectively characterized by classifying attacks based on the time groups during which they occur. For example, some attackers may typically attack on the same day of the week, or at the same hour of the day; therefore adding derived attributes to an attack record that capture the day of week and hour of day (which are derived from the timestamp of the attack) assists in grouping attacks by attacker. Using similar experimentation the inventors have discovered that useful demographic data can be associated with an attack by mapping the source IP address of an attack into location data. For example, attackers may use multiple source IP addresses, but all of these addresses may be registered in a common country or in nearby locations.

FIG. 4 shows derived attributes from the attack time 131 and attack source IP address 132 that the inventors have found effective in clustering attacks. These derived attributes include time-based attributes 401, which may for example be derived from the time 131 of the attack, and location-based attributes 411, which may for example be derived from the source IP address 132 of the attack. These attributes are illustrative; one or more embodiments may use other derived attributes or a subset of the attributes shown in FIG. 4.

The illustrative time-based attributes include:

The attribute Hour-of-Day 402 represents in which hour event has taken place. It may be for example in the range of 0 hr to 23 hr. An illustrative formula that may be used to calculate the hour-of-day in Microsoft Excel™ or similar programming environments is hour-of-day=HOUR([Event Time]). For example, HOUR(31 May 2014 07:29:22 CDT)= 07.

The attribute Day-of-Week 403 represents which day of week the particular event happened. This may be for example an integer between 1 and 7, where 1 represents "Sunday", 2 represents "Monday", 3 represents "Tuesday", 4 represents "Wednesday", 5 represents "Thursday", 6 represents "Friday" and 7 represents "Saturday". An illustrative formula that may be used to calculate the day-of-week in Microsoft Excel™ or similar programming environments is day-of-week=WEEKDAY([Event Time]). For example, WEEKDAY(31 May 2014 07:29:22 CDT)=7.

The attribute Week-of-Year 404 represents the week number (in a year) when particular event taken place. This may be for example an integer between 1 and 52, with 1 for 1st week in the year and 52 for last week of year. An illustrative formula that may be used to calculate the week-of-year in Microsoft Excel™ or similar programming environments is week-of-year=WEEKNUM(Event Time For example, WEEKNUM(31 May 2014 07:29:22 CDT)=22.

The Boolean attribute Is-Holiday 405 indicates whether the time when the attack happened is a "holiday" or not. One simplifying assumption that may be made in one or more embodiments is that Saturday and Sunday are considered as a holiday and other days are not holidays. One or more embodiments may use any calendars of holidays to determine whether an event occurred on an official or unofficial holiday. An illustrative formula that may be used to calculate the is-holiday attribute in Microsoft Excel™ or similar programming environments is is-holiday=1 if WEEKDAY ([Event Time])=1 or 7 ELSE is-holiday=0. For example, since WEEKDAY(31 May 2014 07:29:22 CDT)=7, this date is considered a holiday.

The Boolean attribute Is-Working-Hours 406 indicates whether the event has taken place during what is considered to be in "office time" or not. An illustrative formula that may be used in one or more embodiments to calculate Is-Working-Hours is to treat hours between 8 AM to 6 PM as office time. One or more embodiments may define working hours in any desired manner. For example, IsWorkingHours (31 May 2014 07:29:22 CDT)=0 because HOUR(31 May 2014 07:29:22 CDT)=7

Location based derived attributes 411 may include for example the latitude 413 and longitude 414 of the source IP address, and the country 412 for this location. This information may be obtained from many web services that provide geographic information on any public IP address. Geographic information may not be available for some IP addresses such as private IP addresses.

Additional aspects of attacker behavior that the inventors have discovered are valuable in grouping attacks are the destination IP address and destination port attacked, and the type of attack. Attackers may repeatedly launch attacks against the same destination address and port, or against the same range of ports at multiple IP addresses. They may also repeatedly launch the same or similar types of attacks (such as a buffer overflow attack, or a denial of service attack). These attributes—destination IP address, destination port, and attack type—are generally available in the attack database 103.

The augmented attack data 420 includes both the original attributes 130 (which may be normalized as described for example with respect to FIG. 3) and the derived attributes 401 and 411, such as day-of-week 403 derived from time 131, and country 412 derived from the source IP 132.

Figure 5:
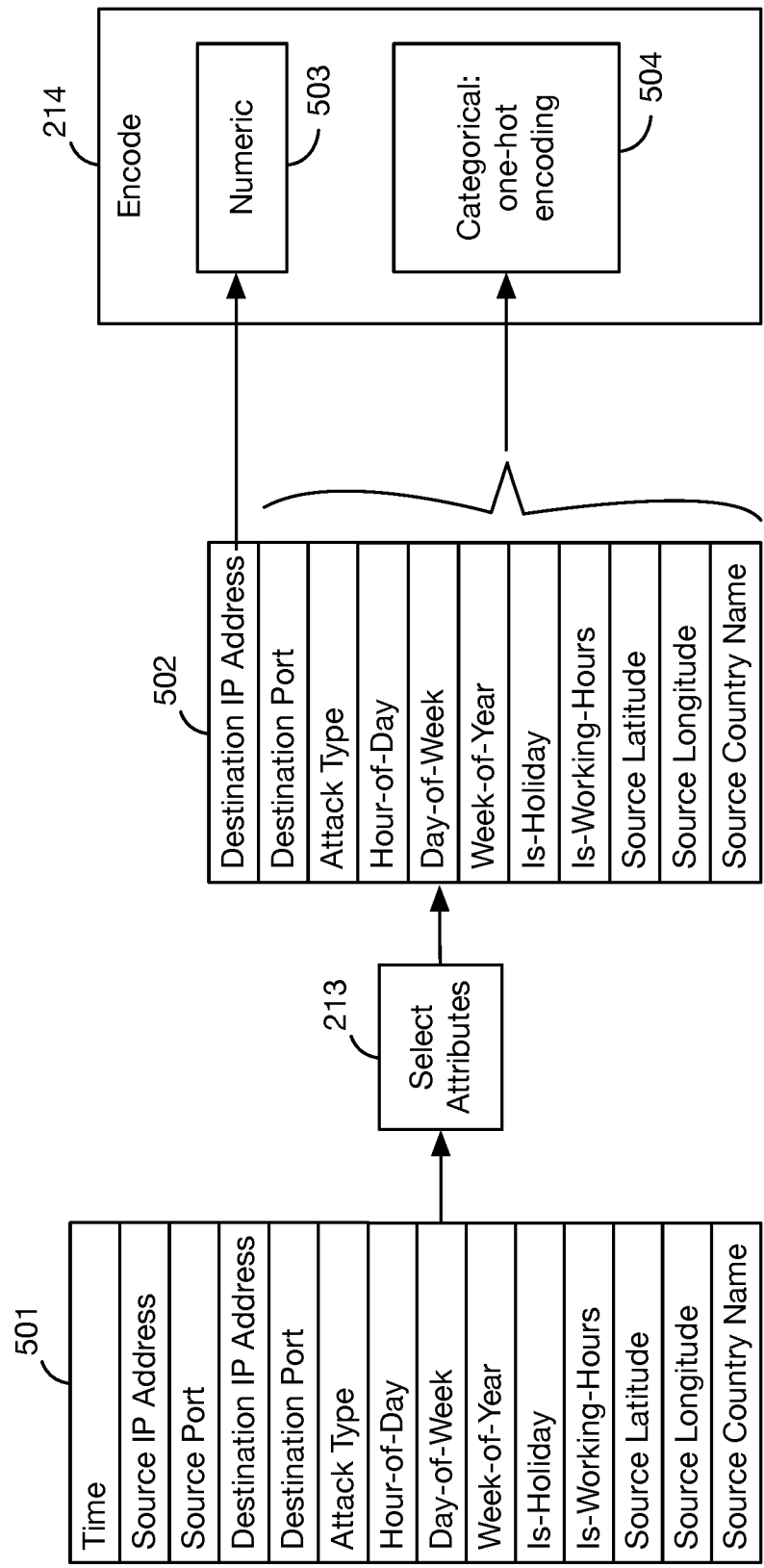
FIG. 5 shows specific attributes, including derived data, that may be selected to group attacks using clustering.

FIG. 5 illustrates the selection step 213 that may select a subset of the attributes 501 (which include the original normalized attributes and the derived attributes) to use for clustering. The inventors have discovered that using the derived time and source location attributes is more effective than using the original attack timestamp and source IP address and port directly. Therefore the selected attributes 502 in one or more embodiments may use these derived time and source location attributes, as well as original attributes for destination IP address and port, and attack type.

The selected attributes 502 may then be encoded in step 214 into a form that may be used by a clustering algorithm. An illustrative encoding partitions the attributes 502 into those that are treated directly as numeric values 503, and those that are treated as categorical data 504, and are encoded for example using one-hot encoding to convert each category into a binary vector with a single 1 bit. For example, the destination IP address may be treated as numeric (using its normalized value), and the other selected attributes may be treated as categorical.

Turning now to the clustering step 215, the inventors have experimented with many different well-known clustering techniques, including for example k-means, expectation maximization, k-medoids, top down clustering, and DBSCAN ("density-based spatial clustering of applications with noise"). The inventors have found that DBSCAN clustering is the most effective technique for grouping attacks by attacker. The DBSCAN algorithm is described in "A Density-Based Algorithm for Discovering Clusters in Large Spatial Databases with Noise", KDD-96 Proceedings, Martin Ester, Hans-Peter Kriegel, Jiirg Sander, Xiaowei Xu. The following provides an overview of the DBSCAN clustering procedure.

DBSCAN requires two parameters: minPts: the number of points within a specified radius (Eps) and ε (eps): radius for the neighborhood of point. It uses a distance function d(p,q) that gives the distance between two points p and q, which are each collections of the encoded, selected attributes. For example, an illustrative distance function is the Euclidean distance between two points: $d(p,q) = \sqrt{\Sigma(p_i - q_i)^2}$.

DBSCAN starts with some random starting point "P" that has not been assigned cluster label. For this point "P" it retrieves neighborhoods within c distance. If number of neighborhoods are more than minPts specified then these will form a cluster, otherwise, the point "P" is labelled as outlier. Note that this point might later be found in a sufficiently sized ε-environment of a different point and hence be made part of a cluster.

If a point is found to be a dense part of a cluster, its ε-neighborhood is also part of that cluster. Hence, all points that are found within the ε-neighborhood are added, as is their own ε-neighborhood when they are also dense. This process continues until the density-connected cluster is completely found. Then, a new unvisited point is retrieved and processed, leading to the discovery of a further cluster or noise.

Illustrative pseudocode to implement DBSCAN is shown below in Table 1:

TABLE 1

DBSCAN Pseudocode

```
initialize eps, MinPts
for each un-visited point "P" in D
{
    mark P as processed
    NeighborhoodPoints = Points within region eps
    if sizeof(NeighborhoodPoints) < MinPts
        mark P as Outlier
    else
        mark all NeighborhoodPoints as processed
        Assign cluster identity "C" for "P" and NeighborhoodPoints
}
```

Figure 6:
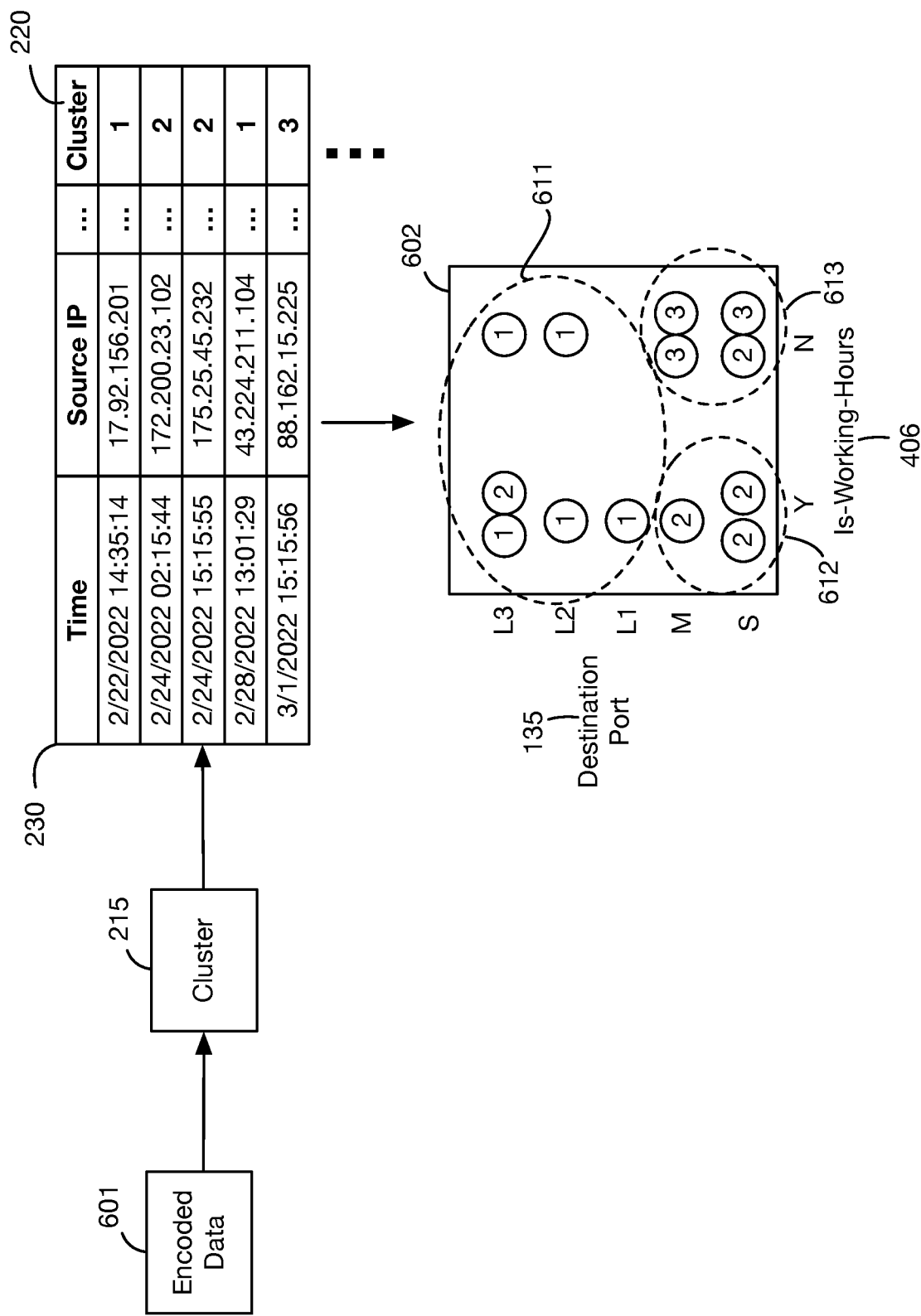
FIG. 6 shows illustrative results of applying clustering to the data described in FIG. 5 in order to identify attackers.

FIG. 6 shows illustrative results of applying clustering 215 to encoded data 601 that results from applying selection step 213 and encoding step 214 to augmented attack information 420. Clustering 215 may use DBSCAN, as described above, or any other clustering algorithms. The clustered data 230 includes a cluster identifier 220 that corresponds to the group assigned to the attack by the clustering algorithm. Graph 602 shows an illustrative result of clustering selected data points. This graph plots attacks on two attributes only for ease of depiction: the is-working-hours binary attribute 406, and the destination port category 135. (Similar plots may be made for any combinations of attributes). In this graph, region 611 corresponds approximately to cluster 1, region 612 corresponds to cluster 2, and region 613 corresponds to cluster 3. These groupings are not perfect when viewed with only these two attributes; however, use of the full set of selected attributes 502 generates clusters that correspond closely to the attackers.

Figure 7:
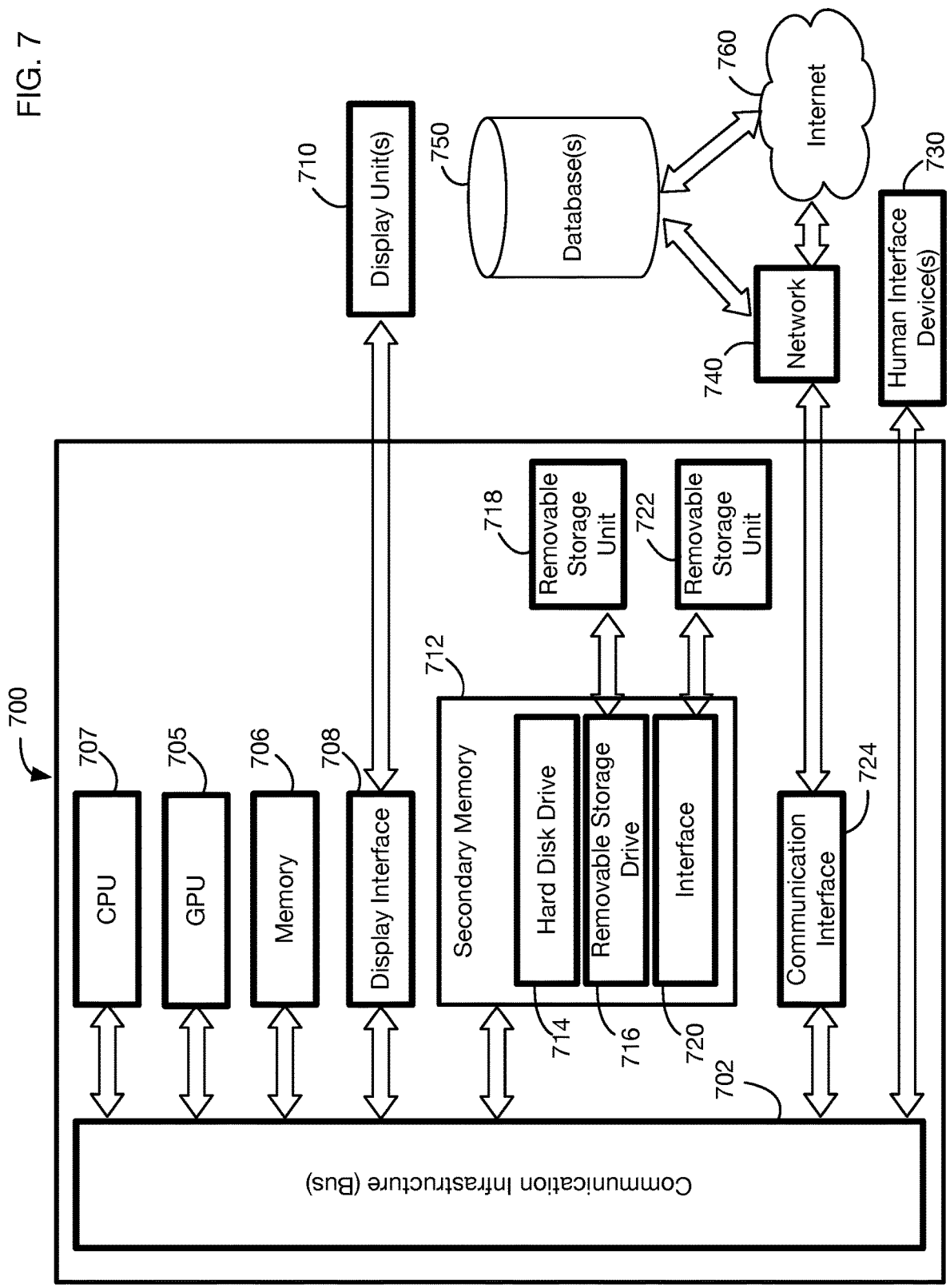
FIG. 7 shows illustrative computer hardware that may be used in one or more embodiments to implement any of the processing, storage, or communication functions of the network security system.

FIG. 7 shows an embodiment of exemplary computer 700 that may be utilized in, by, or as any component in the system. For example, computer 700 or any of its components may correspond with or be incorporated into system or systems 101, or system or systems 201. In one or more embodiments, computer 700 may be a network of computers, each of which may have any or all of the components shown in FIG. 3. In one or more embodiments, computer or computers 700 may also be utilized to implement any function in the system, i.e., any step or act or function that executes in any computer or server or engine in the system. Computer 700 may include processor CPU 707 that executes software instructions specifically tailored to the respective functions of embodiments of the invention. The software instructions, otherwise known as computer program instructions, may reside within memory 706. Computer 700 may include processor GPU 705, which may execute graphics instructions or other instructions for highly parallel operations, for example. GPU program instructions may also reside within memory 706. Computer 700 may include display interface 708, which may drive display unit or units 710 of any computer in the system as desired. Some computers 700 may or may not utilize a display. Computer 700 may include communication interface 724, which may include wireless or wired communications hardware protocol chips. In one or more embodiments of the invention communication interface 724 may include telephonic and/or data communications hardware. In one or more embodiments communication interface 724 may include a Wi-Fi™ and/or BLUETOOTH™ wireless communications interface. Any wireless network protocol or type may be utilized in embodiments of the invention. CPU 707, GPU 705, memory 706, display interface 708, communication interface 724, human interface devices 730, secondary memory 712, such as hard disk 714, removable storage 716, secondary memory interface 720 and removable storage units 718 and 722 may communicate with one another over communication infrastructure 702, which is commonly known as a "bus". Communications interface 724 may communicate over any wired or wireless medium that allows for communication with other wired or wireless devices over network 740. Network 740 may communicate with Internet 760 and/or database or databases 750. Database 750 may be utilized to implement any database described herein, such as attacks database 103 for example.

While the invention herein disclosed has been described by means of specific embodiments and applications thereof, numerous modifications and variations could be made thereto by those skilled in the art without departing from the scope of the invention set forth in the claims.

What is claimed is:

1. A network security system that detects a common attacker who attacks from different source addresses, comprising:
    a database of attacks, wherein each attack in said database of attacks comprises original attributes comprising
        a destination address;
        a destination port;
        a source address;
        a time; and
        an attack type; and,
    a processor coupled to said database of attacks and configured to
        add one or more derived attributes to each attack of said attacks to form augmented attacks,
            wherein said augmented attacks comprise said original attributes and said one or more derived attributes,
            wherein said one or more derived attributes comprise
                one or more source location attributes derived from said source address; and
                one or more time group attributes derived from said time;

execute a clustering algorithm to group said augmented attacks into multiple clusters; and, identify each cluster of said multiple clusters with a corresponding attacker to group said attacks of said database of attacks based on a same attacker, such that each cluster of said multiple clusters comprises attacks of said augmented attacks that originate from said same attacker, and said each attack of said attacks is mapped to said each cluster based on said original attributes and said one or more derived attributes, wherein all of said augmented attacks within said each cluster are from said same attacker; and, normalize the destination address to a numerical value and normalize the destination port to a categorical value.

2. The network security system of claim 1, wherein said one or more source location attributes comprise a source country name;
a source latitude; and,
a source longitude.

3. The network security system of claim 1, wherein said one or more time group attributes comprise an hour-of-day;
a day-of-week;
a week-of-year;
an is-holiday; and,
an is-working-hours.

4. The network security system of claim 1, wherein said clustering algorithm comprises a density-based clustering algorithm.

5. The network security system of claim 4, wherein said density-based clustering algorithm comprises density-based spatial clustering of applications with noise (DBSCAN).

6. The network security system of claim 1, wherein said processor is further configured to normalize said destination address to a numeric value; and, normalize said destination port to a port categorical value.

7. The network security system of claim 6, wherein said port categorical value comprises a small value when said destination port is between 0 and 1000;
a medium value when said destination port is between 1001 and 10000;
a first large value when said destination port is between 10001 and 30000;
a second large value when said destination port is between 30001 and 50000; and,
a third large value when said destination port is larger than 50000.

8. The network security system of claim 1, wherein said processor is further configured to encode selected attributes of said augmented attacks, to form encoded attack data; and,
execute said clustering algorithm on said encoded attack data.

9. The network security system of claim 8, wherein said selected attributes consist of said destination address;
said destination port;
said attack type;
a source country name;
a source latitude; and,
a source longitude;
an hour-of-day;
a day-of-week;
a week-of-year;
an is-holiday; and,
an is-working-hours.

10. The network security system of claim 8, wherein said encode selected attributes comprises encode categorical attributes of said selected attributes using one-hot encoding.

11. A network security system that detects a common attacker who attacks from different source addresses, comprising:

a database of attacks, wherein each attack in said database of attacks comprises original attributes comprising
a destination address;
a destination port;
a source address;
a time; and
an attack type; and, a processor coupled to said database of attacks and configured to
normalize said destination address to a numeric value;
normalize said destination port to a categorical value;
add one or more derived attributes to each attack of said attacks to form augmented attacks,
wherein said augmented attacks comprise said original attributes and said one or more derived attributes,
wherein said one or more derived attributes comprise
one or more source location attributes derived from said source address, said one or more source location attributes comprising
a source country name;
a source latitude; and
a source longitude; and
one or more time group attributes derived from said time, said one or more time group attributes comprising
an hour-of-day;
a day-of-week;
a week-of-year;
an is-holiday; and
an is-working-hours;

encode selected attributes of said augmented attacks, to form encoded attack data, wherein
said selected attributes consist of
said destination address;
said destination port;
said attack type;
said source country name;
said source latitude;
said source longitude;
said hour-of-day;
said day-of-week;
said week-of-year; and
said is-holiday; and
said encode selected attributes comprises encode categorical attributes of said selected attributes using one-hot encoding;

execute a density-based spatial clustering of applications with noise (DBSCAN)clustering algorithm on said encoded attack data to group said augmented attacks into multiple clusters; and, identify each cluster of said multiple clusters with a corresponding attacker to group said attacks of said database of attacks based on a same attacker, such that each cluster of said multiple clusters comprises attacks of said augmented attacks that originate from said same attacker, and said each attack of said attacks is mapped to said each cluster based on said original attributes and said one or more derived attributes, wherein all of said augmented attacks within said each cluster are from said same attacker.

12. The network security system of claim 11, wherein said categorical value comprises:

a small value when said destination port is between 0 and 1000;

a medium value when said destination port is between 1001 and 10000;

a first large value when said destination port is between 10001 and 30000;

a second large value when said destination port is between 30001 and 50000;

and, a third large value when said destination port is larger than 50000.

\* \* \* \* \*